2,916,232

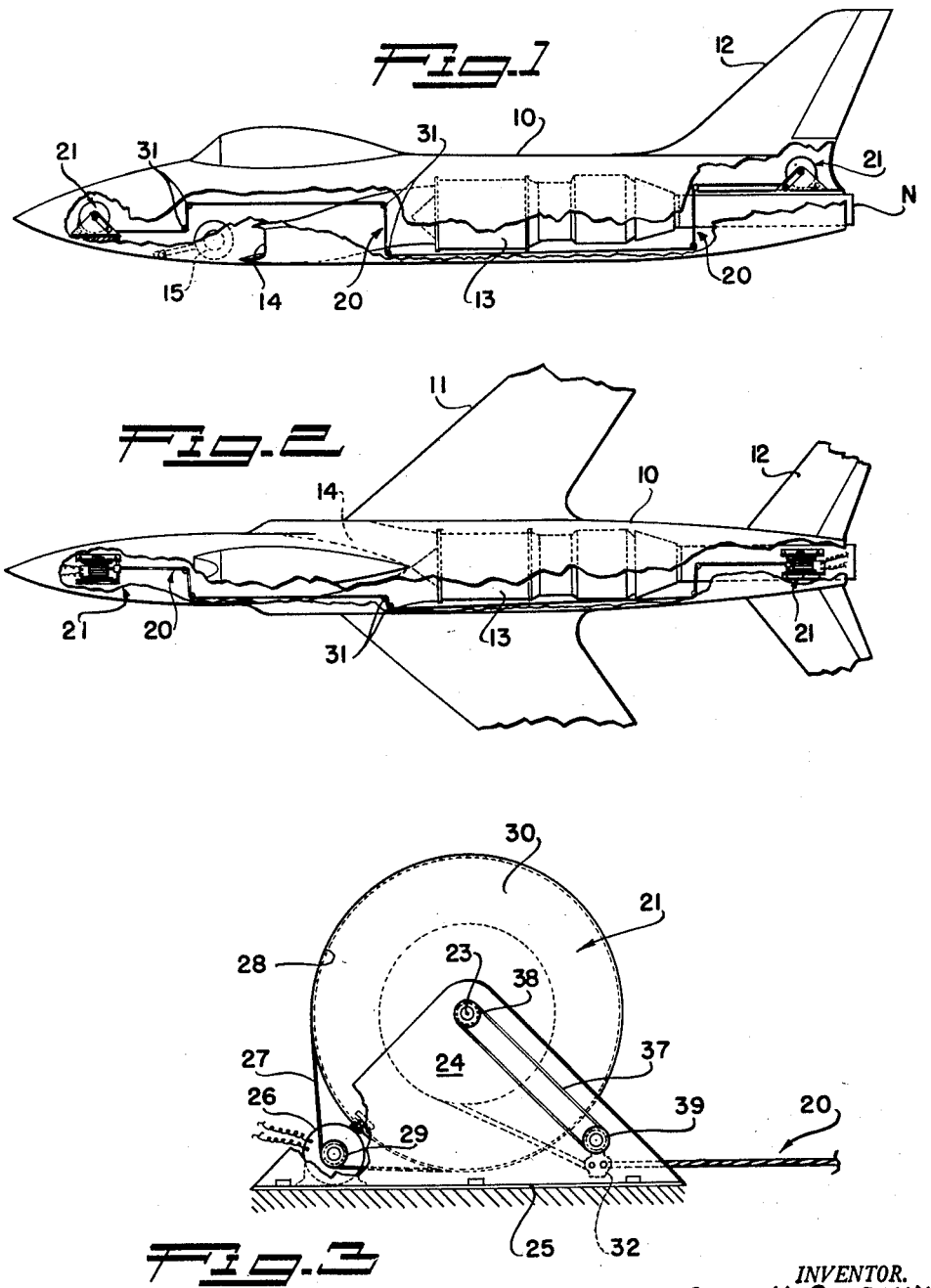

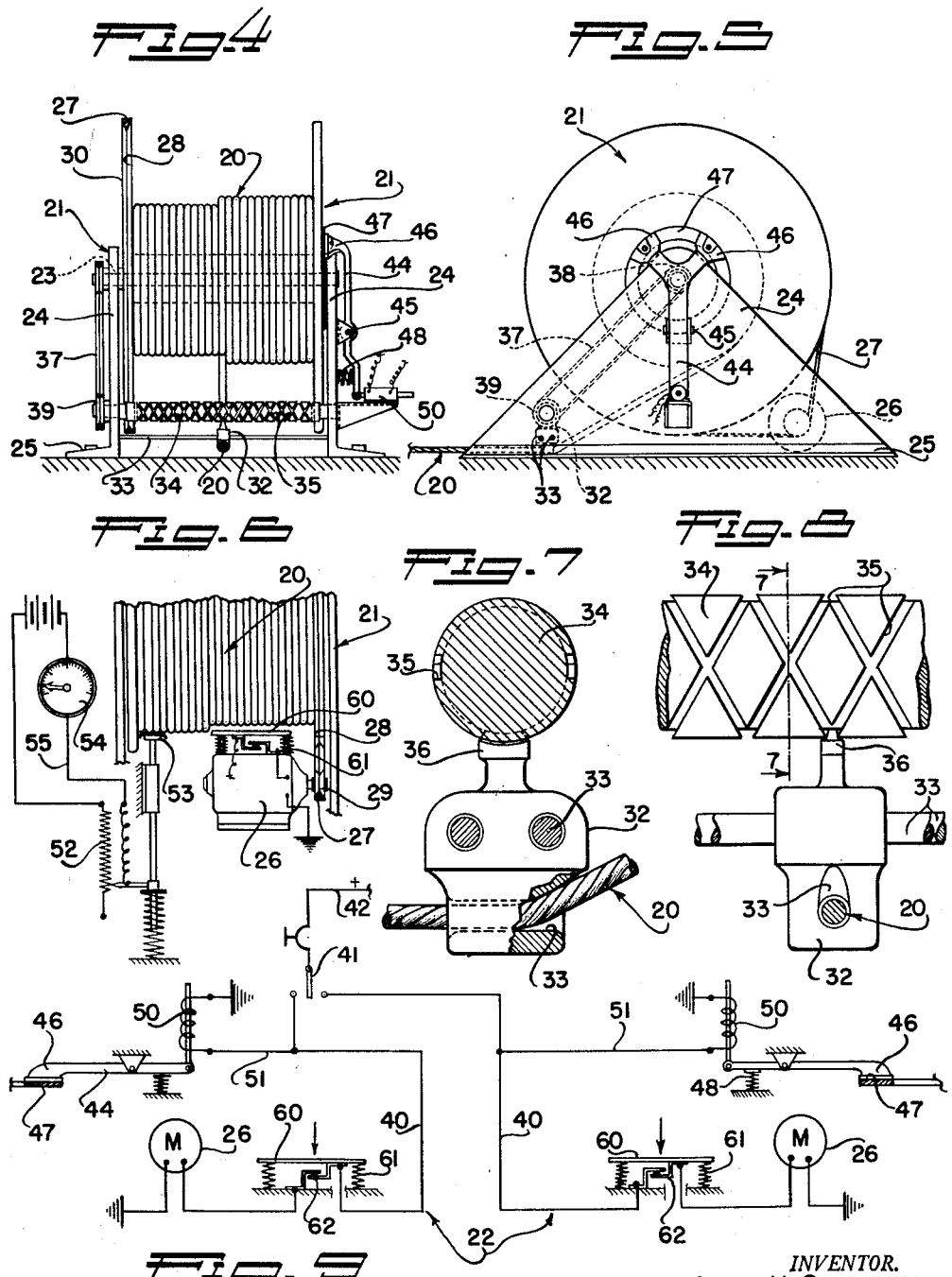

MOVABLE BALLAST SYSTEM FOR AIRCRAFT

Carl H. Schramm, San Fernando, Calif., assignor to Lockheed Aircraft Corporation, Burbank, Calif.

Application February 10, 1955, Serial No. 487,295

15 Claims. (Cl. 244—93)

This invention relates to aircraft and relates more particularly to ballast means or ballast systems for aircraft. It is a general object of the invention to provide a simple, practical and dependable system of this character operable to shift or adjust the center of gravity of an airplane at will.

In operational aircraft such as fighters, the center of gravity of the craft "travels" fore and aft during flight due to the expenditure of fuel, the firing of armament such as rockets, the jettisoning of equipment such as droppable fuel tanks, and for other reasons. In designing such an airplane it is frequently necessary to install a fixed ballast in a location calculated to obtain an optimum or mean fore and aft region of travel of the center of gravity. Such a fixed ballast imposes a definite weight penalty and yet falls far short of remedying the difficulty. Furthermore, a fixed ballast is of little or no avail in the event of substantial changes in the armament to be employed or other deviations from the initial equipment that in any way affect the fore and aft location of the center of gravity. A fixed ballast can not of course reduce the fore and aft travel of the center of gravity during flight, resulting from operations of the craft, nor can it be employed to bring the center of gravity to the most favorable position for take-off, in-flight maneuvers or landing of the airplane.

Ballast systems have been proposed incorporating weights in the form of metal blocks or metal bodies movable fore and aft of the airplane on guides or tracks. This type of system requires the employment of relatively straight tracks for the movable weights and the incorporation of rather complex devices for cushioning the shock attending the stopping of the weights at the ends of their strokes, for restraining or anchoring the weights against acceleration and inertia effects, etc. In modern military aircraft the fuselage region of an airplane is so fully occupied with equipment of various kinds that it is often difficult if not impossible to install a straight track of any appreciable length to accommodate the ballast members or blocks. Furthermore, the shock absorbing devices, restraining means, and the like, required for such a system, impose substantial weight penalties with no compensating advantages or benefits. Ballast systems in which water or other liquid is pumped or otherwise moved from one tank to the other in order to "shift" the center of gravity of the airplane have also been proposed. The specific gravity of liquids usable in such systems, that is, water, hydraulic fluid, and the like, are relatively low, necessitating the employment of large containers or tanks. Space limitations do not permit the installation of such containers. Furthermore, a movable fluid ballast system necessitates the installation and operation of pumps, and where water is employed it must be protected against freezing.

Due to the several shortcomings of the prior movable ballast systems, it is the common practice to either add a fixed ballast or restrict the loading of the airplane, or both, as the conditions seem to indicate. Such measures of course are not adequate solutions and are unsatisfactory.

Another object of the invention is to provide a ballast system for airplanes, and the like, that is adapted for installation or incorporation in present-day aircraft and that is operable during flight to prevent or reduce the center of gravity "travel" that would otherwise result from the operation or incidents of flight.

Another object of the invention is to provide a movable ballast system of this kind that does not require the use of straight tracks or guides and therefore can be employed effectively in crowded, obstructed fuselage regions, etc. The movable weight element of the invention is a flexible member in the form of a cable, or the like, capable of being trained or directed past and around obstructions and objects and requires no track or elongate guides.

A further object of the invention is to provide a fore and aft trim or ballast system in which the weight or ballast can be transmitted to either extremity of the airplane at will during flight or when the airplane is on the ground so that definite aerodynamic and structural advantages are obtainable by incorporating the system into the basic design of the airplane in contra-distinction to the disadvantages resulting from the rather makeshift principle of adding fixed ballast to the aircraft subsequent to fabrication in order to meet certain conditions of operation or equipment installation.

A still further object of the invention is to provide a movable ballast system of this character that is under the full control of the pilot or operator and yet is semi-automatic. The pilot may transmit substantially all or any portion of the ballast either fore or aft as desired and at any time at will and the system incorporates means for automatically terminating operation whenever either of the two extremes of movement of the ballast has been reached.

Other objectives and features of the invention will become apparent from the following detailed description of the typical preferred form and application thereof illustrated in the accompanying drawings in which;

Figure 1 is a more or less diagrammatic side view of an airplane in which the system of the invention is incorporated with the portions broken away to show the system elements in elevation;

Figure 2 is a fragmentary top view of the airplane shown in Figure 1 with parts broken away to expose the ballast system of the invention;

Figure 3 is an enlarged side elevation of one of the drum units of the system;

Figure 4 is a face or end elevation of the drum unit;

Figure 5 is a view similar to Figure 3 illustrating the other side of the drum unit;

Figure 6 is a fragmentary top or plan view of the drum unit illustrating the drive motor and the limit switch means;

Figure 7 is an enlarged vertical sectional view taken substantially as indicated by line 7—7 on Figure 8 showing the traveling element of the level winding mechanism;

Figure 8 is an enlarged fragmentary elevation view of a portion of the level winding mechanism; and Figure 9 is a schematic wiring diagram of the system.

The ballast device or system may of course be employed or incorporated in aircraft of different types and classes and may be modified or designed for use in specific or given airplanes. Furthermore, the size or "capacity" of the system is subject to wide variation to suit it for given installations and if necessary the system may be used in duplicate or multiple fashion. Accordingly, the invention is not to be regarded as restricted to the specific embodiment and installation illustrated in the drawings since these are primarily exemplary, The airplane illustrated in Figures 1 and 2 has a fuselage 10, wings 11 and an empennage 12. An engine 13 of the turbo jet type occupies a major aft portion of the fuselage 10 and has a propulsive nozzle N at the aft end of the airplane. Air intake ducts 14 lead aft through the fuselage to the forward end of the engine 13. In Figure 1 there is illustrated a portion of the landing gear 15 in the retracted condition.

The ballast system of the invention may be said to comprise, generally, a movable ballast or weight element in the form of an elongate flexible cable 20, motor driven drums 21 spaced fore and aft of the airplane upon which the cable 20 is wound or reeled for movement from one drum to the other and a control circuit means 22 for the drums.

The cable 20 which constitutes the movable weight or ballast of the device is preferably steel cable or like cable of high density or substantial weight per unit of length. In practice the cable 20 may be what is known in the aircraft industry as ¼" diameter 7 x 19 extra flexible aircraft cable or the equivalent. The ¼" diameter 7 x 19 extra flexible aircraft cable has a weight of approximately 0.12 pound per lineal foot. I have determined that such cable when reeled or wound on a drum in a relatively close fashion has an approximate density of 0.16 pound per cubic inch which is considerably greater than the density of most liquids, water for example, which has a density of .036 pound per cubic inch. Sufficient quantity of the cable 20 is employed to provide not only a run of cable between the two spaced drums 21 but also a multiplicity of layers of turns of cable on one drum so as to impose the required ballast or weight as found necessary. Thus, with the cable 20 substantially entirely unreeled from one drum 21 the weight of the cable on the other drum 21 constitutes ample ballast for the designed purpose. The length of the cable will usually be considerably greater than the fore and aft length of the airplane.

The drums 21 are usually arranged as near as possible to their respective ends of the fuselage 10. One drum 21 preferably being adjacent the forward end of the fuselage and the other drum preferably being adjacent the aft end. This is the arrangement illustrated in Figures 1 and 2 of the drawings where the drums 21 are immediately adjacent the opposite extremities of the fuselage 10. It is to be understood that such positioning of the drums is not essential and the system or device of the invention operates successfully so long as the two drums are spaced one from the other in the fore and aft direction. Again, while I have shown the drums 21 arranged with their axes of rotation substantially normal to the fore and aft axis of the airplane it is to be understood the drums my be arranged in other positions if found necessary or more practical. The size or cable capacity of the drums 21 will, of course, vary with the installation or opplication. The drums 21 are preferably each separately power or motor driven and insofar as the invention is concerned the two drum installations or assemblies may be the same or substantially identical. The drums proper 21 are fixed to shafts 23 which, in turn, are journaled in the side plates 24 of drum mounts 25 suitably fixed or secured in the airplane. The power means for driving or rotating the drums may be selected to best suit the particular installation. In the case illustrated, a suitable electric motor 26 is mounted adjacent each drum 21 and drives the same through a speed reducing drive means. In the embodiment of the invention illustrated belts 27 operate over relatively small pulleys 29 fixed on the motor shafts and in belt grooves 28 formed in the periphery of a relatively large diametered end plate or flange 30 of the related drum 21. The manner of controlling the drum driving motors 26 will be later described.

The cable 20 extends between and is wound on the two drums 21 in such a manner that the bulk of the cable may be transmitted or transferred from one drum to the other to shift the weight of the wound cable fore or aft of the airplane. Of course in installations where it is feasible or possible, the cable 20 may pass from one drum 21 to the other in a straight run. However, in most cases it will be necessary, or at least desirable, to change the direction of the cable 20 at one or more points between the drums 21 in order to pass around obstructions and equipment within the airplane. This may be readily accomplished by pulley means such as employed in the control cable systems of aircraft. Thus as shown in Figures 1 and 2 the cable 20 may be trained over spaced pulleys 31 which change the direction of the cable so as to clear or pass around obstructions such as the ducts 14, power plant 13, landing gear 15, and other parts and equipment within the airplane. It should be noted that the pulleys 31 may direct the cable vertically, horizontally, and in any other direction as required.

It is desirable to level wind the cable 20 on the drums 21, that is to substantially evenly distribute the cable turns on the drums as the cable is wound thereon. The means illustrated in the drawings for level winding the cable include traveling or reciprocating members 32 slidably guided adjacent the faces of the drums on guide rods 33. These members 32 have openings or eyes 33a for freely slidably passing or guiding the cable 20 to and from the related drums 21. Shafts 34 are journaled in the mounting plates 24 to pass adjacent the members 32 and have right and left hand spiral grooves 35. These intersecting opposite hand grooves 35 join one another adjacent each end of each shaft 34 and the traveling spooling members 32 have fingers or followers 36 for engaging in the grooves of the adjacent shafts. The grooved shafts 34 are driven by and synchronized with their related drums 21 by belts 37 operating over pulleys 38 and 39 fixed on the related drum shafts 23 and grooved shafts 34. It will be seen how the spiraled grooves 35 of the shafts 34, driven by the related drums 21, cooperate with the followers 36 to cause the members 32 to reciprocate back and forth across the faces of the drums to evenly reel the cable thereon.

The control means 22 of the ballast system is operable by the pilot or other operator to cause energization of either drum motor 26 at will and is operable to automatically terminate such operation when substantially the entire bulk of the ballast cable 20 has been reeled on one or the other of the drums. As shown in Figure 9 the means 22 includes an energizing circuit 40 for each motor 26 and a "forward and reverse switch" 41 manually operable to connect either of the circuits 40 with a power lead 42. It will be seen that operation of the switch 41 to one position will energize one motor 26 to cause the cable 20 to be reeled thereon and operation of the switch 41 to the other closed position will cause operation of the other motor 26 so that the cable is reeled up on said other drum 21. In order to provide a suitable "drag" or resistance to rotation of the unactuated drum 20, it is preferred to provide a friction means or brake at each drum 21. In accordance with the broader aspects of the invention any suitable or appropriate braking means may be employed. In the drawings I have shown spring actuated electrically released brake devices at the drums 21. Each of these devices includes a lever 44 pivoted on a drum mounting plate 24 at 45 and provided at one end with two or more pivoted brake shoes 46 cooperable with a strip 47 of friction material on an end face of the adjacent drum 21. A spring 48 cooperates with the opposite end portion of the lever 44 to urge the shoes 46 into braking cooperation with the strip 47. A solenoid 50 is also operatively connected with said other end of the lever 44 and is operable when energized to pivot the lever to a position where the shoes 46 are clear of the adjacent drum 21 and its friction strip 47. Wires or lines 51 connect the solenoids 50 with the motor energizing circuits 40 of the related drums 21 so that the brake lever 44 of a drum unit is moved to the released position simultaneously with energization of the motor 26 of that drum, the brake lever 44 of the other drum remaining in the active or braking position to resist rotation of its related drum. It will be seen that when the switch 41 is operated or closed to energize one drum motor 26 and thus reel the ballast cable 20 onto that drum the brake lever of that drum is moved to the released position, permitting free rotation of the drum and the lever 44 associated with the other drum 21 is urged to or held in the active position by its spring 48 so that the brake shoes 46 cooperating with the strip 47 maintains a suitable drag or resistance to rotation of the "idle drum" thereby maintaining suitable tension on the cable system.

In installations where it may be desirable to compensate for, limit or prevent "travel" of the center of gravity of the airplane during flight by a partial transfer of the ballast cable 20 from one drum 21 to the other the system may preferably include a means sensitive or responsive to the amount of cable on a given drum 21 and operable to provide a "reading" or indication of the quantity of cable on each drum. This means may include a potentiometer 52 mounted adjacent the face of a drum 21 and provided with an actuating or control shoe 53 engaged by the windings of cable 20 on the drum. The potentiometer 52 in turn controls a circuit 55 leading to a meter or indicating unit 54 in the cockpit or pilot's compartment suitably calibrated to indicate the weight of the cable on each of the drums 21.

The control means 22 further includes stop switch means interposed in the motor energizing circuits 40, each operable to de-energize its respective motor 26 when the related drum 21 has received the bulk of the cable 20, that is when the effective ballast weight of the cable has been transferred to that drum. Each limit switch means may include a spring urged shoe 60 arranged adjacent its drum 21 to be engaged and moved outwardly against the spring load by the outermost turns of cable 20 wound on the drum. The springs 61 associated with the shoes 60 normally hold the shoes in positions where contacts 62 interposed in the leads 40 are engaged or closed. When the last or outer row of cable windings has been received on the related drum 21 the shoe 60 is moved outwardly to open the contacts 62 and thus de-energize the motor 26 of the drum.

It is believed that the features and operation of the ballast system of the invention will be apparent from the foregoing detailed description. When it is desired to move the ballast the switch 41 is operated to complete one of the motor circuits 40 to the power lead 42, thus energizing the related motor 26 to cause the ballast cable 21 to be reeled onto that drum. Simultaneously the brake lever 44 of that same drum is released. As the cable 20 is being reeled onto the actuated drum the brake 44 of the other drum remains active to preserve a desirable drag or resistance to rotation to prevent the development of excessive slack in the cable system. The pilot or operator may terminate the shifting of the ballast or weight at any time by merely opening the switch 41, the instrument or meter 54 revealing to him the amount or proportion of cable on each drum 21 at any time. The switch 41 of course may be operated either "forward" or "reverse" to transfer or move the effective weight of the ballast cable either fore or aft in the aircraft as required. It should be observed that when the ballast system is in the idle condition, that is with both circuits 40 de-energized, the brake means 44—45—46 resists or prevents rotation of the drums 21 to prevent acceleration or inertia effects from rotating the drums to create excessive slack in the cable. The cable 20 being flexible may be readily trained around and past various structural parts of the airplane as well as equipment and other parts.

Having described only typical forms of the invention, I do not wish to be limited to the specific details herein set forth, but wish to reserve to myself any variations or modification that may appear to those skilled in the art and fall within the scope of the following claims.

I claim:

1. The combination of an aircraft having a center of gravity and ballast means therefore comprising a rotatable drum spaced forwardly of said center, a rotatable drum spaced aft of said center, a ballast cable wound on the drums, and means connected to each drum for selectively operating the drums to reel the ballast cable from one drum to the other.

2. The combination of an aircraft and ballast means therefore comprising, an aircraft having a forward region and an aft region; a rotatable winding drum in the forward region, a rotatable winding drum in the aft region, a ballast cable extending between the drums and wound thereon, and means connected to each drum for selectively rotating the drums to transfer a substantial portion of the cable from one drum to the other.

3. The combination of an aircraft and ballast means therefore comprising, an aircraft having a forward region and an aft region; a rotatable winding drum in the forward region; a rotatable winding drum in the aft region, a ballast cable extending between the drums and wound thereon, the cable having a length greater than the length of the aircraft, and means connected to the drums for selectively rotating the drums to transfer a substantial portion of the cable from one drum to the other.

4. The combination comprising for an aircraft having fore and aft regions and internal obstructions therebetween and ballast means therefore including a rotatable drum in each of said regions, a ballast cable extending between and wound on the drums, means carried internally of the aircraft for directing the cable around the obstructions, and means connected to each drum for selectively rotating the drums to transfer a portion of the cable from one drum to the other.

5. The combination comprising an aircraft having fore and aft regions and internal obstructions therebetween, a rotatable drum in each of said regions, a ballast cable extending between and wound on the drums, means carried internally of the aircraft for directing the cable around the obstructions, including direction changing pulleys on which the cable is engaged, and means connected to each drum for selectively rotating the drums to transfer a portion of the cable from one drum to the other.

6. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, motor means at each drum for rotating the same, means in contact with each drum for selectively resisting rotation of the same, and a control connected to each motor means for energizing the motor means of either drum so that a portion of the ballast element is transferred from one drum to the other.

7. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, means associated with each drum for rotating the same, releasable means in contact with each drum for resisting rotation of the same, and a control system connected to each drum operable to simultaneously energize the rotating means of either drum and to release the rotation resisting means of that drum.

8. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, motor means connected to each drum for rotating the same, releasable brake means at each drum for resisting rotation of the same, and a control coupled to motor means selectively energizing the motor means of either drum and for releasing the brake means thereof.

9. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, means associated with each drum for rotating the same, a control system coupled to the last mentioned means selectively operable to activate either of said means at will, and limit means in contact with said element operable to automatically limit rotation of the drums.

10. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, means associated with each drum for rotating the same, and a control system coupled to the last mentioned means selectively operable to energize either of said means at will to cause a substantial amount of said element to be wound from one drum onto the other drum to thus transfer the weight of said portion from one side to said center to the other.

11. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, means associated with each drum for rotating the same, a control system coupled to the last mentioned means selectively operable to energize either of said means at will to cause a substantial amount of said element to be wound from one drum onto the other drum to thus transfer the weight of said portion from one drum to the other, and level winding means engageable with the element of each drum directing the element to reel substantially evenly thereon.

12. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, means associated with each drum for rotating the same, a control system coupled to the last mentioned means selectively operable to energize either of said means at will to cause a substantial amount of said element to be wound from one drum onto the other drum to thus transfer the weight of said portion from one side of said center to the other, and a cable guiding member operably connected to each drum reciprocable across the face of each drum to direct the cable thereon.

13. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, a motor for rotating each drum, brake means at each drum for resisting rotation of the same, electrical means connected to the brake means for releasing each brake means, an energizing circuit for the motor and said electrical means of each drum whereby the same may be simultaneously energized, and manual switch means coupled in the energizing circuit controlling said circuit and electrical means.

14. The combination of an aircraft and ballast means therefore comprising an aircraft having a fore and aft axis, two rotatable drums connected to said aircraft, said rotatable drums spaced from one another in a direction corresponding to said fore and aft axis, a flexible ballast element extending between and wound on the drums, a motor for rotating each drum, brake means at each drum for resisting rotation of the same, electrical circuit means interconnecting the brake means for releasing each brake means, an energizing circuit for the motor and said electrical circuit means of each drum whereby the same may be simultaneously energized, limit switch means in each circuit responsive to the amount of said element on the related drum to open the respective circuit when a given amount of the element is on said drum, and manual switch means interconnecting said circuits for controlling the same.

15. The combination of an aircraft and ballast means therefore comprising an aircraft, an elongate flexible weight element, means supporting the element in the aircraft and operable to move the same fore and aft of the aircraft, and means electro-mechanically connected to the first named means for actuating the first named means.

References Cited in the file of this patent

UNITED STATES PATENTS

| 545,095 | Redmond | Aug. 27, 1895 |
| 652,243 | Brown | June 26, 1900 |
| 1,710,225 | Kennedy | Apr. 23, 1929 |
| 1,765,195 | Ax | June 17, 1930 |
| 2,526,783 | Toogood | Oct. 24, 1950 |
| 2,626,760 | Chick | Jan. 27, 1953 |